(12) United States Patent
Borowski et al.

(10) Patent No.: US 7,742,741 B2
(45) Date of Patent: Jun. 22, 2010

(54) PORTABLE WIRELESS DATA STORAGE DEVICE

(75) Inventors: Joerg Borowski, Dresden (DE); George Minassian, Cupertino, CA (US); Joe Tom, Foster City, CA (US)

(73) Assignee: GlobalFoundries Inc., Grand Cayman (KY)

( * ) Notice: Subject to any disclaimer, the term of this patent is extended or adjusted under 35 U.S.C. 154(b) by 1215 days.

(21) Appl. No.: 11/316,506

(22) Filed: Dec. 21, 2005

(65) Prior Publication Data
US 2006/0246840 A1 Nov. 2, 2006

(51) Int. Cl.
*H04B 7/00* (2006.01)

(52) U.S. Cl. ........... 455/41.2; 455/171.1; 455/168.1; 455/176.1; 348/207.1; 713/169

(58) Field of Classification Search ........... 455/41.2, 455/171.1, 168.1, 176.1, 188.1; 348/207.1, 348/207.11; 713/169, 171
See application file for complete search history.

(56) References Cited

U.S. PATENT DOCUMENTS

| | | | |
|---|---|---|---|
| 6,018,775 A | | 1/2000 | Vossler et al. |
| 6,184,651 B1 | | 2/2001 | Fernandez et al. |
| 6,707,274 B1 | * | 3/2004 | Karr ........................... 320/107 |
| 7,149,839 B2 | * | 12/2006 | Aull et al. ................... 710/310 |
| 7,224,805 B2 | * | 5/2007 | Hurst et al. .................. 380/285 |
| 7,327,385 B2 | * | 2/2008 | Yamaguchi .............. 348/207.1 |
| 7,420,990 B2 | * | 9/2008 | Ching et al. ................. 370/468 |
| 7,478,755 B2 | * | 1/2009 | Sekiguchi .............. 235/462.24 |
| 2003/0007646 A1 | * | 1/2003 | Hurst et al. .................. 380/285 |
| 2003/0114206 A1 | | 6/2003 | Timothy et al. |
| 2003/0174838 A1 | * | 9/2003 | Bremer ....................... 380/270 |
| 2004/0189246 A1 | | 9/2004 | Bulai et al. |
| 2005/0027385 A1 | * | 2/2005 | Yueh ........................... 700/94 |
| 2005/0042999 A1 | | 2/2005 | Rappaport |
| 2005/0062454 A1 | | 3/2005 | Raghunath et al. |
| 2005/0090756 A1 | * | 4/2005 | Wolf et al. .................. 600/546 |
| 2005/0120381 A1 | * | 6/2005 | Yamaguchi ................. 725/105 |
| 2005/0181826 A1 | * | 8/2005 | Yueh ........................ 455/556.2 |
| 2006/0149858 A1 | * | 7/2006 | Bhesania et al. ............... 710/5 |

(Continued)

FOREIGN PATENT DOCUMENTS

DE 19807227 9/1999

(Continued)

OTHER PUBLICATIONS

Examination Report issued for UK Application No. GB0720860.6 dated Jan. 12, 2009.

(Continued)

*Primary Examiner*—Minh D Dao
(74) *Attorney, Agent, or Firm*—Meyertons, Hood, Kivlin, Kowert & Goetzel, P.C.

(57) ABSTRACT

A portable data storage device is provided having a non-volatile memory and a wireless data interface. The wireless data interface is coupled to the non-volatile memory to read data from the non-volatile memory for transmission through the wireless data interface and/or write data received from the wireless data interface to the non-volatile memory. The wireless data interface is a high data rate interface and/or a broadband interface. Data rates may be above 100 Mbps, and bandwidths may be 100 MHz or above. There is further provided a corresponding data storage method.

53 Claims, 5 Drawing Sheets

U.S. PATENT DOCUMENTS

| | | | |
|---|---|---|---|
| 2006/0195695 A1* | 8/2006 | Keys | 713/169 |
| 2006/0208088 A1* | 9/2006 | Sekiguchi | 235/472.02 |
| 2007/0030796 A1* | 2/2007 | Green | 370/208 |
| 2007/0083695 A1* | 4/2007 | Aull et al. | 710/310 |
| 2008/0019398 A1* | 1/2008 | Genossar et al. | 370/498 |
| 2009/0088077 A1* | 4/2009 | Brown et al. | 455/41.2 |

FOREIGN PATENT DOCUMENTS

| | | |
|---|---|---|
| DE | 10028813 | 12/2001 |
| EP | 1220150 | 7/2002 |
| EP | 1355229 A | 10/2003 |
| EP | 1515452 | 3/2005 |
| KR | 2002068004 | 7/2002 |
| WO | 2004/029855 | 4/2004 |

OTHER PUBLICATIONS

Translation of Official Communication application No. 1-2—5 020 062.1 issued Jan. 13, 2006.

Translation of Official Communication in application No. DE 10 2005 020 062.1 issued May 29, 2008.

Lee, J.Y., "Method of coupling wireless USB LAN card with USB flash memory device" *Database WPI*, Section Ch, Week 2003, Aug. 24, 2002.

Notification of Transmittal of the International Search Report and the Written Opinion of the International Searching Authority, or the Declaration, International Application No. PCT/US2006/015534, Aug. 30, 2006.

International Search Report, International Application No. PCT/US2006/015534, Aug. 30, 2006.

Written Opinion of the International Searching Authority, International Application No. PCT/US2006/015534, Aug. 30, 2006.

* cited by examiner

PORTABLE WIRELESS DATA STORAGE DEVICE

BACKGROUND OF THE INVENTION

1. Field of the Invention

The invention generally relates to portable data storage devices and corresponding methods, and in particular to storing data in a non-volatile memory.

2. Description of the Related Art

Presently, a number of different flash memory cards or sticks are available on the market to allow users to store data. Flash memory (Flash-EPROM, Flash Erasable Programmable Read Only Memory) is a solid-state, non-volatile, re-writable memory that is durable, operates at low voltages, and retains data when power is off. Flash memory devices are used in digital cameras, cell phones, printers, handheld or notebook computers, pagers, audio recorders, or the like.

Flash memory cards or sticks connect the flash IC (integrated circuit) via a flash disk controller chip to the host device, i.e. a notebook, camera or the like, using an interface which requires the flash memory stick or card to be inserted into a dedicated slot or other connector. For instance, flash memory devices can be connected to host devices via a USB (Universal Serial Bus) connection. If the flash device is an SD (Secure Digital) memory card, the connection to the host device is done using an SDIO (SD Input Output) interface. Similar dedicated interfaces exist for other flash memory devices such as CF (Compact Flash) devices.

That is, taking the example of a user wishing to take pictures using a digital camera and transferring the pictures to a personal computer, the conventional techniques require the user to insert a flash memory card into the camera before taking the picture, and then remove the card from the camera and insert it into a card reader of the personal computer, or connect the camera to the computer to use the card reader of the camera.

Such handling is often found to be cumbersome. Further, since it might be necessary to frequently put the cards into the reader slots and take them out afterwards, there might occur some mechanical wear. In addition, it is not possible to use any flash memory card in any card reader which makes it sometimes difficult to transfer data from one host device to another host device.

SUMMARY OF THE INVENTION

In an embodiment, a portable data storage device is provided that comprises a non-volatile memory, and a wireless data interface. The wireless data interface is coupled to the non-volatile memory to read data from the non-volatile memory for transmission through the wireless data interface and/or write data received from the wireless data interface to the non-volatile memory. The wireless data interface is a high data rate interface adapted to transmit and/or receive data at data rates above 100 Mbps.

In another embodiment, a portable data storage device comprises a non-volatile memory and a wireless data interface which is coupled to the non-volatile memory to read data from the non-volatile memory for transmission through the wireless data interface and/or write data received from the wireless data interface to the non-volatile memory. The wireless data interface is a broadband interface adapted to transmit and/or receive data in at least one band having a width of 100 MHz or above.

In a further embodiment, there is provided a method of storing data. The method comprises transmitting data to be stored to a portable data storage device through a wireless link at a high data rate and/or in an ultra wide band. The method further comprises receiving the data at the portable data storage device, and storing the received data in a non-volatile memory of the portable data storage device.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

As will be described in more detail below, the embodiments make use of a wireless data interface to transfer data from and to the portable data storage device. This avoids using wired interfaces to increase the usability of the device. Further, portability of the device is increased since the portable data storage device can be carried separately from the host device such as a notebook computer or camera. Moreover, the devices of the embodiments are portable even during read and write operation.

Unlike known contactless IC cards such as ISO/IEC 10536 close coupled cards, ISO/IEC 14443 proximity cards, and ISO/IEC 15693 vicinity cards which are identification cards that cannot be used for transferring high data volumes, the embodiments use wireless data transmission techniques that can keep card read/write times in the order of seconds even where the data volume to transfer is in the MB range or above. To achieve this, the embodiments use a high data rate wireless interface and/or a wireless interface transferring the data in an ultra wide band. To give an example, a high data rate is a data rate above 100 Mbps, and an ultra wide band has a bandwidth of 500 MHz or above (according to the definition of the FCC which is also used in IEEE standardization processes).

In one embodiment, UWB (Ultra Wide Band) technology is used. UWB differs substantially from conventional narrow band radio frequency and spread spectrum technologies, such as Bluetooth™ technology and 802.11a/g. UWB transmitter and receiver can use frequencies from 3.1 GHz to 10.6 GHz which is a band more than 7 GHz wide. Each radio channel in the band can have a bandwidth of more than 500 MHz. The spectrum can be shared by multiple UWB devices to obtain very high data throughput.

Another embodiment uses high-speed WUSB (Wireless Universal Serial Bus) connectivity which is a technique based on UWB. WUSB uses OFDM (Orthogonal Frequency Divisional Multiplexing) for each sub-band. In the multiband OFDM approach, the available spectrum of 7.5 GHz is divided into several 528 MHz bands.

That is, the embodiments use a broadband, high data rate wireless interface which allows for accessing the stored data in the device in a contactless manner with complete read/write times remaining in the order of seconds. Therefore, this technique is not only user-friendly and easy to use, but does further increase the operating speed compared with conventional techniques, and provide new functionality.

Figure 1:
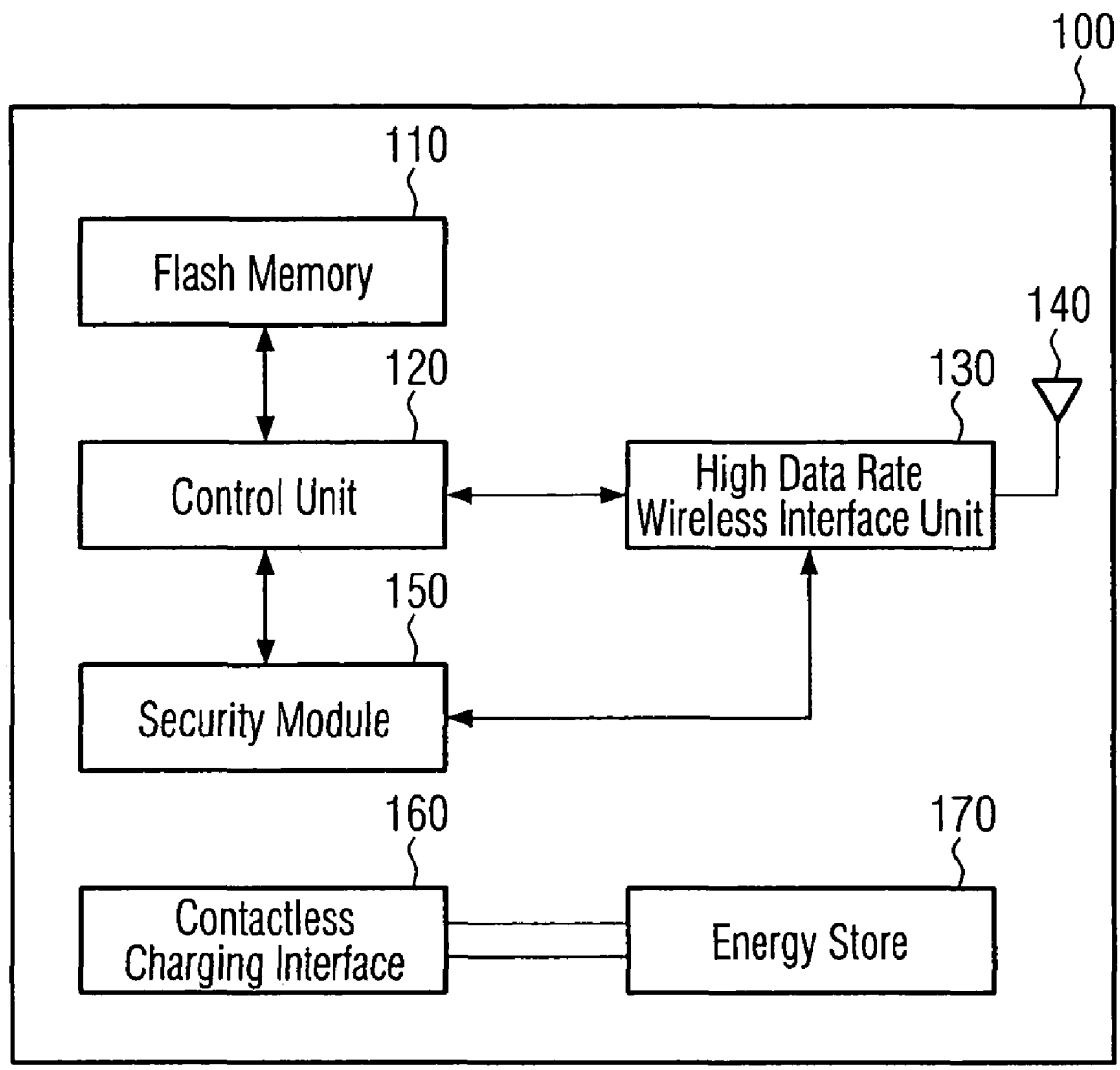
FIG. 1 is a block diagram illustrating the components of a portable data storage device according to an embodiment.

Referring now to the drawings, FIG. 1 is a block diagram illustrating a portable data storage device according to an embodiment. The device 100 comprises a flash memory unit 110 which may be (in this and any other embodiment) an EEPROM device or any other kind of non-volatile memory including a hard disc drive. There is further provided a control unit 120 which is connected to the flash memory 110 to control reading and/or writing from/to the memory. In addition, there is a high data rate wireless interface unit 130 connected to the control unit 120. The high data rate wireless interface unit 130 is further connected to an antenna 140 to transmit and/or receive the data.

As described above, the high data rate wireless interface unit 130 may be UWB, WUSB, or OFDM based. In other embodiments, any high data rate and/or ultra wide band transmission technique may be used.

As apparent from FIG. 1, the portable data storage device 100 of the present embodiment further comprises a security module 150 that may be connected to the control unit 120 and/or the high data rate wireless interface unit 130. The security module 150 provides security features such as authentication, link security, DRM (Digital Rights Management) content security, or the like. That is, the security module 150 may assure access, data link, as well as content security, allowing for realize the portable data storage device as portable secure memory card.

The device 100 of the embodiment shown in FIG. 1 does not have any wired connection to other devices. That is, the housing 100 of the device has no electric contacts at its outer surface. In an embodiment, the housing is waterproof.

As may be further seen from FIG. 1, the portable data storage device 100 comprises a contactless charging interface 160 connected to an energy store 170. The energy store 170 may be a battery, a capacitor, or any other element which is capable of storing (electrical, chemical, mechanical or other forms of) energy.

The contactless charging interface 160 may be any unit which can receive energy in any form from outside the device 100 without requiring electric contacts, and transfer the received energy or parts thereof to the energy store 170. In an embodiment, the contactless charging interface 160 is an inductive coupling interface. In another embodiment, the contactless charging interface 160 may comprise a photovoltaic element to realize an optical interface to convert incoming optical energy to electrical energy which may then be stored in the energy store 170.

In an embodiment, the control unit 120 controls the high data rate wireless interface unit 130 (and potentially also the other units of the device) to operate in any one of at least two operating modes. These modes may be selected from a sleep mode, a listen mode, and a transceiver mode.

In the sleep mode, the portable data storage device 100 is in some kind of standby, not accessing the non-volatile memory, and not transmitting any data. In this mode, the device 100 does substantially nothing more than necessary to decide whether memory access or data transmission is required. For doing so, the control unit 120 may determine whether data is received by the high data rate wireless interface unit 130 which data indicates a request for memory access. This request may be indicated in a predefined manner, e.g. using a predefined data pattern at a predefined frequency. It is however noted that other approaches are possible as well.

In the listen mode, the portable data storage device 100 is fully operative to receive data through the wireless interface in the entire ultra wide band and/or at high data rate, and write the received data to memory.

In the transceiver mode, both receiving and transmitting data is enabled. In this mode, the non-volatile memory can be written to and read from.

In an example, the portable data storage device 100 has a high data rate wireless interface unit 130 which uses high rate UWB 802.15.3a compliant OFDM at 480 Mbps in the 3.1-4.8 GHz range. Further, flash memory 110 is used which consumes 0.4 µW and 45 mW in standby and read operation, respectively, at 1.8 V, allowing to read data at 80-200 Mbps. In this example, the power consumption of the portable data storage device 100 may be 2 mW or below in the sleep mode, 85 mW in the listen mode, and 195 mW in the transceiver mode.

Figure 2:
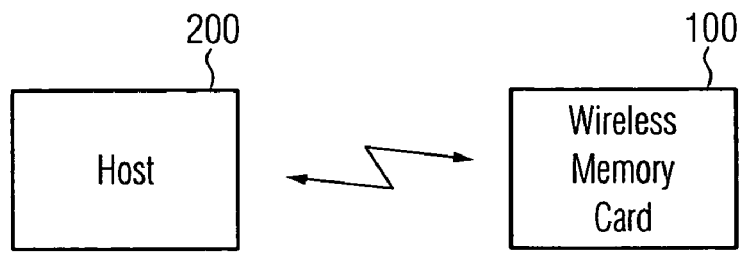
FIG. 2 is a schematic drawing illustrating an example of how to use the portable data storage device of FIG. 1.

Referring now to FIG. 2, an example is given of how to use the portable data storage device 100 of the above-described embodiments. As shown in the figure, the device 100 has established a wireless link to a host 200 which may be a notebook computer, a digital camera, a PDA (Personal Digital Assistant) or the like. For instance, the host device 200 may have some suitable wireless interface circuitry built in so that it is not necessary to have a slot for inserting the memory card. For example, if the host device 200 is a camera, one can take pictures which are then stored on the portable data storage device 100 although the device 100 is not inserted into the camera. For instance, the device 100 could be worn in a pocket or bag. If the host device 200 is a personal computer, the portable data storage device 100 could be somewhere on the desk, in a drawer, or even in a shelf.

Figure 3:
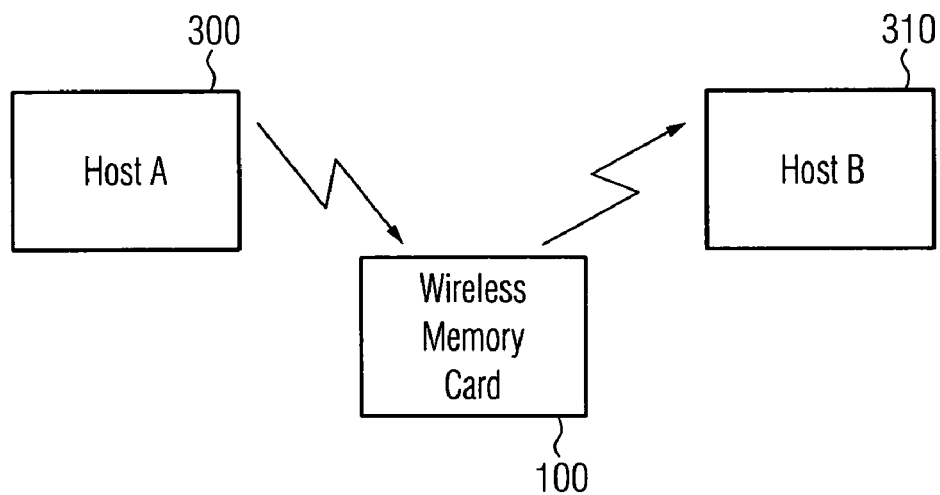
FIG. 3 is a schematic drawing illustrating another example of how to use the device of FIG. 1.

FIG. 3 depicts an example where two host devices 300, 310 access the portable data storage device 100. The host devices 300, 310 may do so (substantially) simultaneously, or subsequently. Further, each host device 300, 310 may have unidirectional or bi-directional access.

For example, host device 300 could be a video camera that stores the video data in real time in the non-volatile memory of the portable data storage device 100. The host device 310 may be a computer that downloads the video data or part of the data.

Other examples of host devices in the configurations shown in FIGS. 2 and 3 may be public or commercial terminals that allow a user of the portable data storage device 100 to obtain music, video or software. For instance, the owner of a portable data storage device 100 such as that of FIG. 1 could then buy music songs by approaching a terminal in a music shop, selecting one or more songs, performing some authentication to let the terminal identify and access the device 100, and probably run through some payment procedure. The terminal will then download the purchased song(s) without requiring the user to put the device 100 into a slot of the terminal.

Another useful example of where to use the portable data storage device 100 of the embodiments may be a terminal that receives picture data from the portable data storage device 100 to make photographic prints.

It is to be understood that many other applications besides those mentioned above exist as well.

Figure 4:
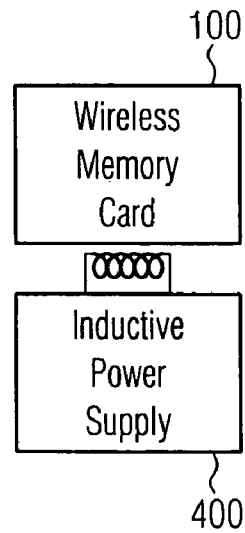
FIG. 4 is a diagram illustrating how to supply power to the device of FIG. 1 in an embodiment.

As mentioned above, the portable data storage device 100 of the embodiments may have a completely contactless housing. In this case, the portable data storage device 100 is supplied with power in a contactless manner, i.e. without using electrical contacts, for instance based on solar energy or by means of inductive coupling. The latter example is shown in FIG. 4 where the portable data storage device 100 has a coil built in (not shown) which is placed in a suitable position on top or nearby an inductive power supply 400. The inductive power supply 400 may be portable itself, or may be a built-in device in a host or any other external peripheral device such as a docking station.

Figure 5:
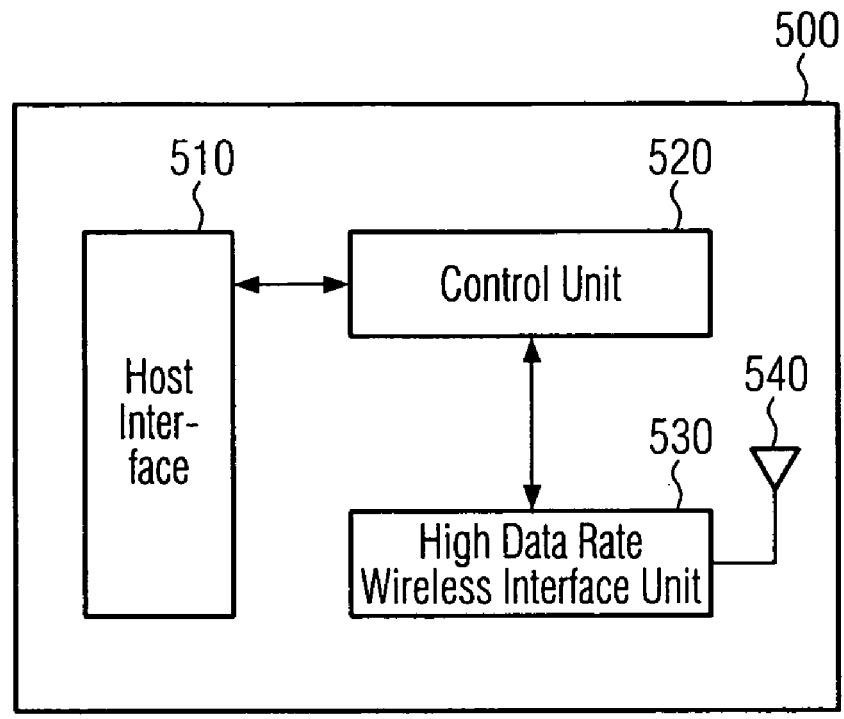
FIG. 5 is a block diagram illustrating the components of a wireless adapter card that can be used together with the portable data storage device of FIG. 1.

In the examples described above, the host devices are described to include some wireless interface circuitry that allows the hosts to communicate with the portable data storage device 100. In another example, the wireless interface functionality can be added to a host device by means of a wireless adapter 500 which can be realized as card or stick, but which may also take any other form, including that of an external peripheral device. An example of a wireless adapter 500 is shown in FIG. 5.

As may be seen from this figure, the wireless adapter 500 of the present embodiment has a host interface 510, a control unit 520, and a high data rate wireless interface unit 530 with an antenna 540. The host interface 510 may be a USB interface, a Firewire interface, a serial or parallel data interface, or one of the various flash memory card interfaces.

Figure 6:
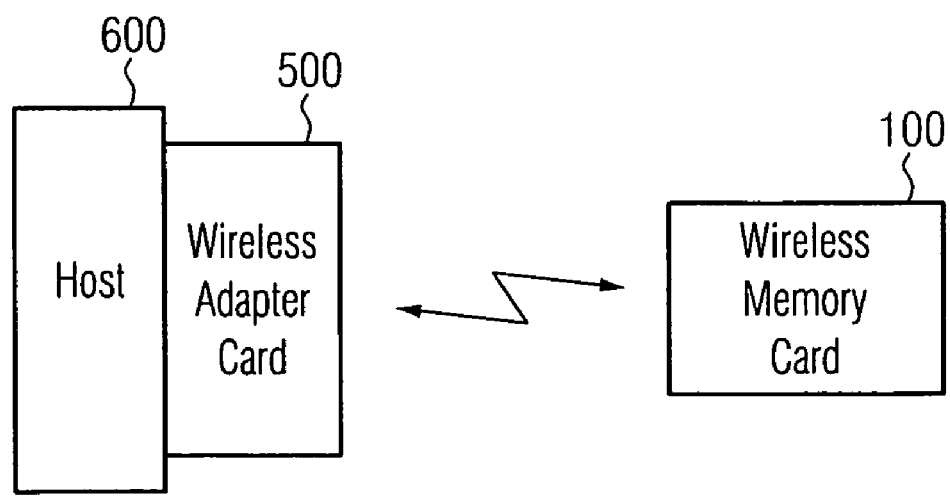
FIG. 6 is a schematic drawing illustrating an example of how to use the wireless adapter card of FIG. 5 in an embodiment.

Once having attached the wireless adapter 500 to the host device, by putting the adapter into a dedicated slot or by using a flexible or rigid cable, the host device is provided with the required wireless communication functionality to communicate with the portable data storage device 100. This is depicted in an example in FIG. 6.

Figure 7:
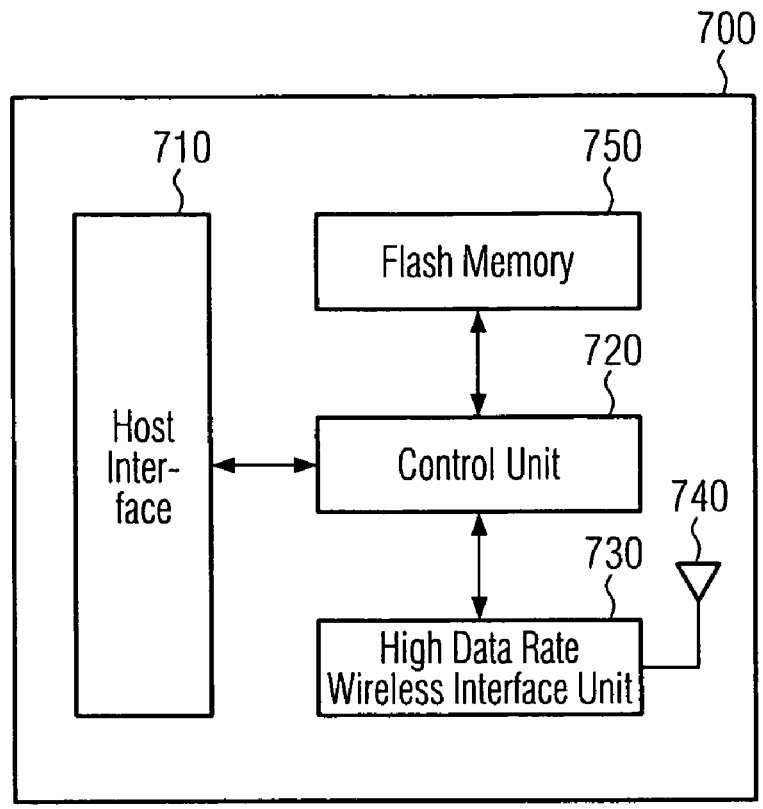
FIG. 7 is a block diagram illustrating the components of a portable data storage device according to another embodiment.

Referring to FIG. 7, a wireless adapter memory device according to an embodiment is shown. Similar to the wireless adapter 500 of FIG. 5, the wireless adapter memory device 700 of FIG. 7 has a host interface 710, a control unit 720, a high data rate wireless interface unit 730, and an antenna 740. In addition, there is a non-volatile memory 750 which may be a flash memory.

This allows the wireless adapter memory device 700 to act as wireless adapter similar to that of FIG. 5 in a first functional mode, and as portable data storage device similar to that of FIG. 1 in a second functional mode. Further, there may be a third functional mode where the high data rate wireless interface unit 730 is deactivated, so that the device 700 may then work like any conventional flash memory device.

Figure 8:
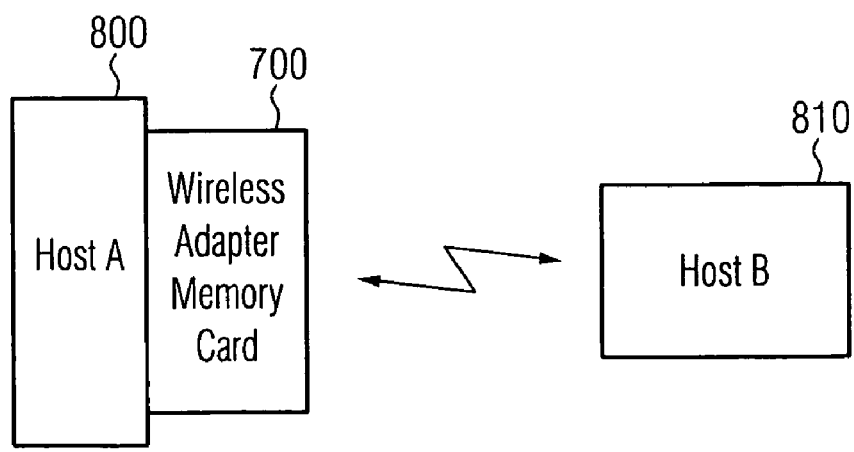
FIG. 8 is a schematic drawing showing an example of how to use the device of FIG. 7 in an embodiment.
Figure 9:
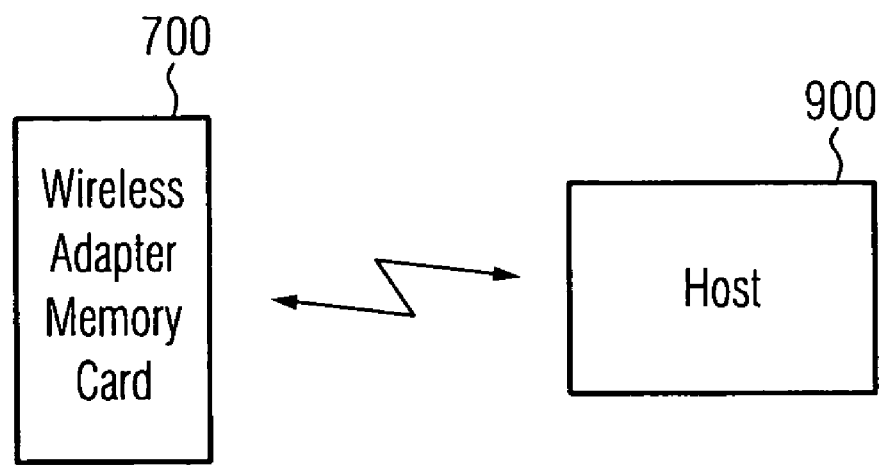
FIG. 9 is a schematic drawing illustrating another example of how to use the portable data storage device of FIG. 7.
Figure 10:
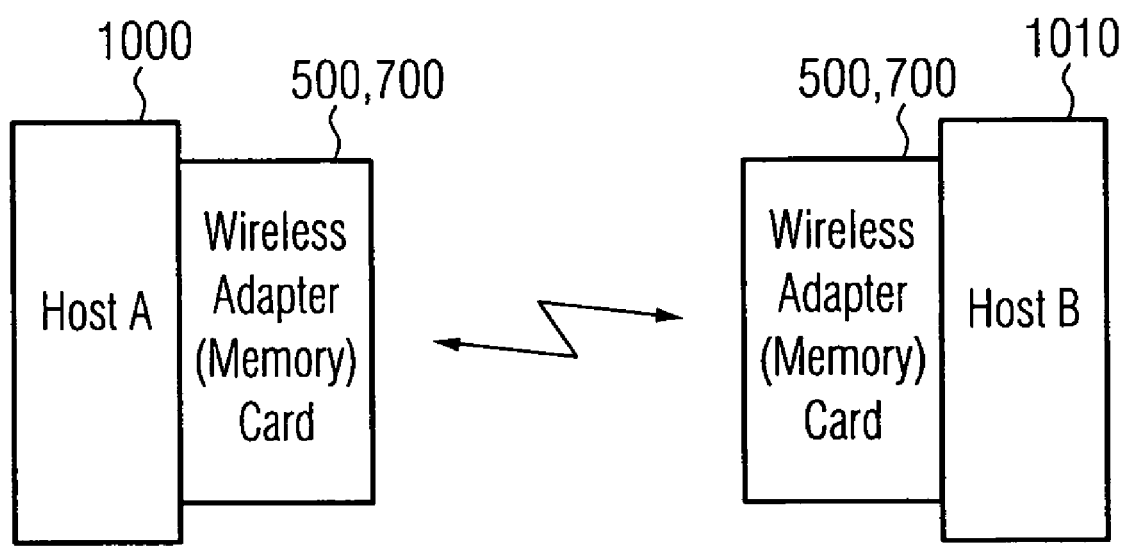
FIG. 10 shows another example of using the portable data storage device according to the embodiments.

FIGS. 8 to 10 illustrate some exemplary configurations. FIG. 8 has the wireless adapter memory device 700 of FIG. 7 connected to a first host 800 to allow the host 800 to store data in the non-volatile memory without using the wireless interface. A second host 810 may then access the stored data through the wireless link. This may be done even though the wireless adapter memory device 700 is still connected to the first host 800, as shown in FIG. 8, or after having removed the wireless adapter memory device 700 from the host 800, as shown in FIG. 9. The arrangement of FIG. 9 may be used in a number of other possible applications including those described above with reference to FIGS. 2 and 3.

Finally, FIG. 10 more generally illustrates cases where two hosts 1000, 1010 communicate with each other using wireless adapters 500 or wireless memory adapter devices 700. Many configurations may exist in FIG. 10 including having two wireless adapters 500, two wireless adapter memory devices 700, or having the wireless adapter memory device 700 on the left or on the right side.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A portable data storage device comprising:
a non-volatile memory; and
a wireless data interface coupled to said non-volatile memory to read data from said non-volatile memory for transmission through said wireless data interface and/or write data received from said wireless data interface to said non-volatile memory,
wherein said wireless data interface is a high data rate interface configured to transmit and/or receive data at a data rate of at least 100 Mbps;
wherein the portable data storage device further comprises:
a control unit configured to control said wireless data interface to operate in a sleep mode, and wherein the control unit is configured to determine, in the sleep mode, whether data is received by the high data rate interface which indicates a request for memory access, wherein said request is indicated by using a pre-defined data pattern at a pre-defined frequency.

2. The portable data storage device of claim 1, wherein said wireless data interface is a broadband interface adapted to transmit and/or receive data in at least one band having a width of at least 100 MHz.

3. The portable data storage device of claim 1, wherein said wireless data interface is a UWB (Ultra Wide Band) interface.

4. The portable data storage device of claim 1, wherein said wireless data interface is a WUSB (Wireless Universal Serial Bus) interface.

5. The portable data storage device of claim 1, wherein said wireless data interface is an OFDM (Orthogonal Frequency Division Multiplexing) interface.

6. The portable data storage device of claim 1, wherein said non-volatile memory is an EPROM (Erasable Programmable Read Only Memory) based flash memory.

7. The portable data storage device of claim 1, further comprising:
a security module adapted to provide at least one security mechanism to protect data or wireless data transfers.

8. The portable data storage device of claim 7, wherein said security module is adapted to apply an authentication mechanism.

9. The portable data storage device of claim 7, wherein said security module is adapted to apply a wireless link security mechanism.

10. The portable data storage device of claim 7, wherein said security module is adapted to apply a DRM (Digital Rights Management) content security mechanism.

11. The portable data storage device of claim 1, having a housing with no electric contacts at its outer surface.

12. The portable data storage device of claim 1, having a housing being water proof.

13. The portable data storage device of claim 1, further comprising:
a contactless charging interface adapted to supply power to said portable data storage device without requiring establishment of a wired electric connection to said portable data storage device.

14. The portable data storage device of claim 13, wherein said contactless charging interface is an inductive coupling interface.

15. The portable data storage device of claim 13, wherein said contactless charging interface is an optical interface comprising a photovoltaic element.

16. The portable data storage device of claim 1, further comprising:
a control unit adapted to control said wireless data interface to operate in any one of at least two operating modes selected from the sleep mode, a listen mode, and a transceiver mode.

17. The portable data storage device of claim 1, further comprising:
a host interface unit adapted to provide a wired interface to a host system to enable operating said portable data storage device as adapter device linking said host system to another portable data storage device connected through said wireless data interface.

18. The portable data storage device of claim 1, further comprising:
a host interface unit adapted to provide a wired interface to a host system to allow said host system to read and/or write data from/to said non-volatile memory.

19. A portable data storage device comprising:
a non-volatile memory; and
a wireless data interface coupled to said non-volatile memory to read data from said non-volatile memory for transmission through said wireless data interface and/or write data received from said wireless data interface to said non-volatile memory,
wherein said wireless data interface is a broadband interface configured to transmit and/or receive data in at least one band having a width of at least 100 MHz;
wherein the portable data storage device further comprises:
a control unit configured to control said wireless data interface to operate in a sleep mode, and wherein the control unit is configured to determine, in the sleep mode, whether data is received by the high data rate interface which indicates a request for memory access, wherein said request is indicated by using a pre-defined data pattern at a pre-defined frequency.

20. The portable data storage device of claim 19, wherein said wireless data interface is a high data rate interface configured to transmit and/or receive data at a data rate of at least 100 Mbps.

21. The portable data storage device of claim 19, wherein said wireless data interface is a UWB (Ultra Wide Band) interface.

22. The portable data storage device of claim 19, wherein said wireless data interface is a WUSB (Wireless Universal Serial Bus) interface.

23. The portable data storage device of claim 19, wherein said wireless data interface is an OFDM (Orthogonal Frequency Division Multiplexing) interface.

24. The portable data storage device of claim 19, wherein said non-volatile memory is an EPROM (Erasable Programmable Read Only Memory) based flash memory.

25. The portable data storage device of claim 19, further comprising:
a security module adapted to provide at least one security mechanism to protect data or wireless data transfers.

26. The portable data storage device of claim 25, wherein said security module is adapted to apply an authentication mechanism.

27. The portable data storage device of claim 25, wherein said security module is adapted to apply a wireless link security mechanism.

28. The portable data storage device of claim 25, wherein said security module is adapted to apply a DRM (Digital Rights Management) content security mechanism.

29. The portable data storage device of claim 19, having a housing with no electric contacts at its outer surface.

30. The portable data storage device of claim 19, having a housing being water proof.

31. The portable data storage device of claim 19, further comprising:
a contactless charging interface adapted to supply power to said portable data storage device without requiring establishment of a wired electric connection to said portable data storage device.

32. The portable data storage device of claim 31, wherein said contactless charging interface is an inductive coupling interface.

33. The portable data storage device of claim 31, wherein said contactless charging interface is an optical interface comprising a photovoltaic element.

34. The portable data storage device of claim 19, further comprising:
a control unit adapted to control said wireless data interface to operate in any one of at least two operating modes selected from the sleep mode, a listen mode, and a transceiver mode.

35. The portable data storage device of claim 19, further comprising:
a host interface unit adapted to provide a wired interface to a host system to enable operating said portable data storage device as adapter device linking said host system to another portable data storage device connected through said wireless data interface.

36. The portable data storage device of claim 19, further comprising:
a host interface unit adapted to provide a wired interface to a host system to allow said host system to read and/or write data from/to said non-volatile memory.

37. A method of storing data, comprising:
transmitting data to be stored to a portable data storage device through a wireless link at a high data rate and/or in an ultra wide band;
receiving said data at the portable data storage device; and
storing the received data in a non-volatile memory of the portable data storage device;
wherein the method further comprises:
a control unit of said portable data storage device causing the portable data storage device to operate in a sleep mode;

determining, while operating in the sleep mode, whether data is received by the wireless link that indicates a request for memory access, wherein said request is indicated by using a pre-defined data pattern at a pre-defined frequency.

38. The method of claim 37, wherein said data rate is at least 100 Mbps.

39. The method of claim 37, wherein the bandwidth of said ultra wide band is at least 500 MHz.

40. The method of claim 37, wherein said wireless link is a UWB (Ultra Wide Band) link.

41. The method of claim 37, wherein said wireless link is a WUSB (Wireless Universal Serial Bus) link.

42. The method of claim 37, wherein said wireless link is an OFDM (Orthogonal Frequency Division Multiplexing) link.

43. The method of claim 37, wherein said non-volatile memory is an EPROM (Erasable Programmable Read Only Memory) based flash memory.

44. The method of claim 37, further comprising:
providing at least one security mechanism.

45. The method of claim 44, wherein said security mechanism comprises an authentication mechanism.

46. The method of claim 44, wherein said security mechanism comprises a wireless link security mechanism.

47. The method of claim 44, wherein said security mechanism comprises a DRM (Digital Rights Management) content security mechanism.

48. The method of claim 37, further comprising:
supplying power to said portable data storage device by means of a contactless charging interface without requiring establishment of a wired electric connection to said portable data storage device.

49. The method of claim 48, wherein said contactless charging interface is an inductive coupling interface.

50. The method of claim 48, wherein said contactless charging interface is an optical interface comprising a photovoltaic element.

51. The method of claim 37, further comprising:
operating said portable data storage device in any one of at least two operating modes selected from the sleep mode, a listen mode, and a transceiver mode.

52. The method of claim 37, further comprising:
operating a wired interface to a host system to enable operating said portable data storage device as adapter device linking said host system to another portable data storage device connected through said wireless link.

53. The method of claim 37, further comprising:
operating a wired interface to a host system to allow said host system to read and/or write data from/to said non-volatile memory.

* * * * *